(12) United States Patent
Henriques et al.

(10) Patent No.: US 11,587,289 B2
(45) Date of Patent: Feb. 21, 2023

(54) DETERMINATION OF VERTICES OF TRIANGULAR GRIDS FOR THREE-DIMENSIONAL OBJECT REPRESENTATIONS (71) Applicants: HEWLETT-PACKARD DEVELOPMENT COMPANY, L.P., Spring, TX (US); UNIVERSIDADE FEDERAL DE PERNAMBUCO, Recife (BR)

(72) Inventors: Diogo Henriques, Recife (BR); Francisco Simoes, Recife (BR); Silvio Melo, Recife (BR); Andre Silva, Recife (BR); Thiago Chaves, Recife (BR); Gustavo Charamba, Recife (BR); Joao Teixeira, Recife (BR); Veronica Teichrieb, Recife (BR); Gutenberg Barros, Recife (BR); Walter Correia, Recife (BR); Thiago Domingues, Recife (BR); Vinicius Castilho, Recife (BR); Marcelo Riss, Porto Alegre (BR); Scott A. White, Boise, ID (US)

(73) Assignees: Hewlett-Packard Development Company, L.P., Spring, TX (US); Universidade Federal de Pernambuco, Pernambuco (BR)

(*) Notice: Subject to any disclaimer, the term of this patent is extended or adjusted under 35 U.S.C. 154(b) by 0 days.

(21) Appl. No.: 17/296,827

(22) PCT Filed: Dec. 11, 2018

(86) PCT No.: PCT/US2018/065017
§ 371 (c)(1),
(2) Date: May 25, 2021

(87) PCT Pub. No.: WO2020/122882
PCT Pub. Date: Jun. 18, 2020

(65) Prior Publication Data
US 2022/0028164 A1    Jan. 27, 2022

(51) Int. Cl.
G06T 17/20        (2006.01)

(52) U.S. Cl.
CPC .................................. *G06T 17/20* (2013.01)

(58) Field of Classification Search
None
See application file for complete search history.

(56) References Cited

U.S. PATENT DOCUMENTS 6,906,718 B1    6/2005  Papakipos
6,996,505 B1    2/2006  Edelsbrunner et al.
(Continued)

OTHER PUBLICATIONS

Paul, Ratnadeep, and Sam Anand. "A new Steiner patch based file format for additive manufacturing processes." Computer-Aided Design 63 (2015): 86-100.*

(Continued)

*Primary Examiner* — Sultana M Zalalee
(74) *Attorney, Agent, or Firm* — Michael Dryja (57) ABSTRACT

An example of a non-transitory computer-readable medium storing machine-readable instructions. The instructions may cause the processor to receive a three-dimensional (3D) object representation and subdivide it into a triangular grid. Curved triangles may be calculated for triangles in the triangular grid. The triangles may be subdivided and differences calculated between corresponding sections of the curved triangles and the received 3D object representation.

17 Claims, 5 Drawing Sheets

(56) References Cited

U.S. PATENT DOCUMENTS

| | | | |
|---|---|---|---|
| 7,643,030 B2 | 1/2010 | Papakipos et al. | |
| 8,405,655 B2 | 3/2013 | Onodera et al. | |
| 9,836,884 B2 | 12/2017 | Quilot et al. | |
| 2009/0206522 A1 | 8/2009 | Hein | |
| 2011/0295564 A1 | 12/2011 | Chazal | |
| 2014/0184599 A1* | 7/2014 | Quilot | G06T 17/20 345/423 |
| 2015/0106065 A1 | 4/2015 | Hartmann | |
| 2016/0358376 A1* | 12/2016 | Lacey | G06T 17/205 |
| 2017/0286567 A1 | 10/2017 | Hana | |
| 2017/0372480 A1* | 12/2017 | Anand | G06T 19/20 |
| 2019/0019331 A1* | 1/2019 | Alliez | G06T 15/005 |

OTHER PUBLICATIONS

Greco F et al, "Finite element analysis enhanced with subdivision surface boundary representations", Finite Elements in Analysis and Design, Sep. 2017, 56-72, vol. 137, No. 29, XP085222254, ISN: 0168-874X, DOI:10.1016/JFinel.2017.09.002.

Jorg Peters, "Smooth patching of refined triangulations", ACM transactions on Graphics, Jan. 1, 2011, 1-9, vol. 20, No. 1, vol. 20, No. 1, XP058203133, ISN: 0730-0301, DOI: 10.1145383745. 383746.

Paul Ratnadeep, "Modelling and Optimization of Powder Based Additive Manufacturing (AM) Processes", Jan. 1, 2013, ii-168, vol. 1, No. 15, XP055407531, http://rave.ohiolink.edu/edtc/view?accnum=ucin1378113813.

Xiaoqun Wu et al, "Simplification of Meshes into Curved PN Triangles", Proceedings of the Second APSIPA Annual Summit and Conference, Dec. 14, 2010, XP055721712, http://www.apsipa.org/proceedings2010/pdf/APSIPA120.pdf.

Branch; "Fitting Surface of Free Form Objects Using Optimized NURBS Patches with Evolutionary Strategies"; 2007; BMVC.

Laug P. et al; "Discrete CAD Model for Visualization and Meshing"; 2016; Elsevier.

Pagani Luca et al; "Curvature Based Sampling of Curves and Surfaces"; Dec. 14, 2017; Elsevier.

Xiaoqun Wu; "Simplification of Meshes into Curved PN Triangles"; Proceedings of the Second APSIPA Annual Summit and Conference; pp. 598-604; Dec. 14-17, 2010.

* cited by examiner

DETERMINATION OF VERTICES OF TRIANGULAR GRIDS FOR THREE-DIMENSIONAL OBJECT REPRESENTATIONS

BACKGROUND

Representations of three-dimensional (3D) objects may be created in an application on a computer system. Between creating a 3D object representation and manipulating it or preparing it for printing by a 3D printer, multiple 3D object representation formats may be used, with a computer system converting the representation between different representation formats. One representation of a 3D object is NURBS (Non-Uniform Rational B-Splines), which a 3D printing pipeline may convert into a triangular mesh before slicing the object for material deposition.

BRIEF DESCRIPTION OF THE DRAWINGS

Various examples will be described below referring to the following figures.

DETAILED DESCRIPTION

Converting 3D object representations between various formats may introduce differences between the 3D object representations. Some 3D object representation formats may better represent curved surfaces. Other formats may be easier to process into planar slices for use in a 3D printing process. Calculating the differences between corresponding sections of different 3D object representations of the same object may be used in evaluating whether the section has been converted with sufficient accuracy and in selecting a set of vertices to use in converting a 3D object representation into other formats.

Subdividing a parametric space of a 3D object representation into shapes may be performed to identify shapes with large differences between the pre- and post-conversion 3D objects. Those shapes may be subdivided into sub-shapes to compare the pre- and post-conversion 3D objects to identify shapes with large differences. By repeatedly subdividing the shapes with large differences, a set of points may be found for subdividing the pre-conversion 3D object into sections for conversion into other formats.

Figure 1:
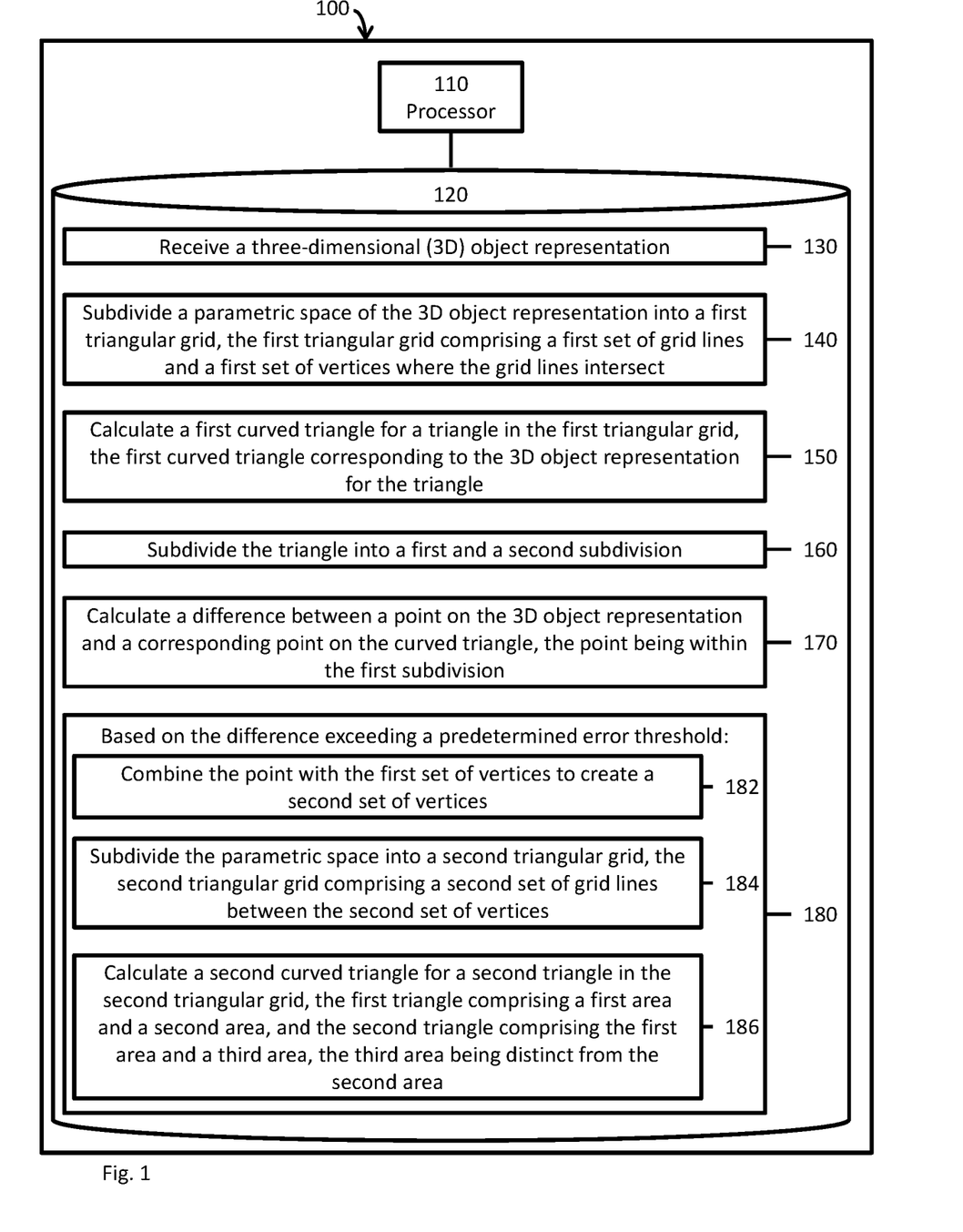
FIG. 1 shows a computer system with computer-executable instructions stored on a computer-readable medium to calculate differences between a received 3D object representation and a curved triangle in accordance with various examples.

FIG. 1 shows a computer system 100 with computer-executable instructions 130, 140, 150, 160, 170, 180, 182, 184, 186 stored on a computer-readable medium 120 to calculate differences between a received 3D object representation and a curved triangle in accordance with various examples. The curved triangle may be a Steiner Patch. Machine-readable instruction 130, when executed by the processor, may cause the processor to receive a three-dimensional (3D) object representation. Machine-readable instruction 140, when executed by the processor, may cause the processor to subdivide a parametric space of the 3D object representation into a first triangular grid, the first triangular grid comprising a first set of grid lines and a first set of vertices where the grid lines intersect. Machine-readable instruction 150, when executed by the processor, may cause the processor to calculate a first curved triangle for a triangle in the first triangular grid, the first curved triangle corresponding to the 3D object representation for the triangle. Machine-readable instruction 160, when executed by the processor, may cause the processor to subdivide the triangle into a first and a second subdivision. Machine-readable instruction 170, when executed by the processor, may cause the processor to calculate a difference between a point on the 3D object representation and a corresponding point on the curved triangle, the point being within the first subdivision. Machine-readable instruction 180, when executed by the processor, may cause the processor to execute instructions 182, 184, 186 based on the difference exceeding a predetermined error threshold. Machine-readable instruction 182, when executed by the processor, may cause the processor to combine the point with the first set of vertices to create a second set of vertices. Machine-readable instruction 184, when executed by the processor, may cause the processor to subdivide the parametric space into a second triangular grid, the second triangular grid comprising a second set of grid lines between the second set of vertices. Machine-readable instruction 186, when executed by the processor, may cause the processor to calculate a second curved triangle for a second triangle in the second triangular grid, the first triangle comprising a first area and a second area, and the second triangle comprising the first area and a third area, the third area being distinct from the second area.

In various examples, the processor 110 may comprise a microprocessor, a microcomputer, a controller, a field programmable gate array (FPGA), or discrete logic to execute machine-readable instructions. The processor 110 may be part of a computer system 100, such as a laptop or desktop computer, a server, a cell phone, or a tablet. The processor 110 may execute the instructions 130, 140, 150, 160, 170, 180, 182, 184, 186 stored in the computer-readable medium 120. The processor 110 may execute machine-readable instructions that implement the methods discussed in connection with other figures herein. The computer-readable medium 120 may store the 3D object representations in different formats. The computer-readable medium 120 may include a hard drive, solid state drive (SSD), flash memory, electrically erasable programmable read-only memory (EEPROM), or random access memory (RAM).

An object may be modeled in a computer-assisted design (CAD) application. The CAD application may create a non-uniform rational basis spline (NURBS) representation of the object. A NURBS representation format may offer flexibility and precision in modeling the object. The NURBS representation may capture the surface area of the object being represented. A mesh format may be used to represent the same object. The mesh format may comprise multiple polygons connected along their sides. For example, different sizes and shapes of triangles may be used to represent the surface area of the object. The NURBS representation may be able to better capture curves of the object, while the mesh may approximate curves by using small polygons. The mesh may be more easily manipulated for other purposes, such as determining an intersection with a plane.

A Steiner Patch, also known as a rational quadratic Bezier triangle, may be used to model the object to allow for more closely matching curves than planar triangles, while using less memory. A planar triangle may be represented by three points in Euclidean space, one per corner of the planar triangle. A point may include three numbers for coordinates, an x, y, and z. These coordinates may be represented by floating point numbers, or nine floating point numbers per planar triangle. A Steiner Patch may be represented by 21 floating point numbers, such as three corner points Euclidean space, three intermediary control points in Euclidean space, and one weight per intermediary control point. As the Steiner Patch allows modeling of a 3D curved triangle, modeling an object using a mesh of Steiner Patches may use less storage than modeling an object using a mesh of planar triangles, while doing so with a higher accuracy. Other curved triangles may also be used, such as a rational cubic Bezier triangle, or other higher degrees of curved triangles.

In 3D printing a 3D model, the model may be "sliced" by calculating its intersection with a plane in three-dimensional Euclidean space. An object may be 3D printed by printing such slices, one on top of another. Curved triangles and planar triangular meshes may be sliced for 3D printing. Slicing a NURBS representation may be more difficult than slicing a curved triangle or planar triangular mesh. Thus, the NURBS representation may be converted to a curved triangle or mesh format before being 3D printed. The curved triangle or mesh format may comprise multiple triangles. Calculating the intersection of the 3D object representation with a plane in three-dimensional Euclidean space may include calculating the intersection of the plane with multiple curved triangles or multiple triangles of a triangular mesh.

The received 3D object representation may have its parametric space subdivided into a triangular grid. Parametric space includes a set of coordinates that allows evaluating individual points on the surface of a 3D object. The distance between two points may be different in parametric space and across the surface of the object in Euclidean space, due to distortions introduced by converting the representation between Euclidean space and parametric space. The triangular grid may be formed by subdividing the parametric space into a square grid and then dividing the squares in two, forming right triangles sharing a hypotenuse that connects opposite corners. Dividing the squares in two may be done using a set of parallel lines. The triangular grid may be uniform in parametric space, such that every triangle in the grid is of the same size. The triangular grid may be formed in various ways and formed of triangles other than right triangles.

The received 3D object representation may be converted to another format on a piecemeal basis by converting the subdivided sections to a new format. In various examples, curved triangles may be calculated for the subdivided sections of the received 3D object representation.

A difference may be calculated between the received 3D object representation and the converted 3D object representation. The difference may indicate the differences between the surface area of the received 3D object representation and the converted 3D object representation. The difference may include a distance between the surfaces at various corresponding points in the two 3D object representations. The difference may be a sum or an average of the distances between the surfaces at corresponding points. In various examples, the selected points may be a center of the corresponding subdivided sections, such as the barycenter. The distance between the two 3D object representations may include calculating the chordal error at the barycenter. In various examples, the curved triangle may be subdivided and the differences between those subdivisions and corresponding sections of the received 3D object representation calculated.

In various examples, the difference between the received and the converted 3D object representations for a subdivision may exceed a predetermined error threshold. This may indicate a closer fit between the two 3D object representations is desired. The calculated curved triangle may be discarded and the points where the difference exceeds the predetermined error threshold may be added as vertices for creation of a new triangular grid in the parametric space of the received 3D object representation. New curved triangles may be created for the triangles in the new triangular grid, and the differences between the new curved triangles and the received 3D object representation may be calculated.

In various examples, finding points with large differences and adding those points to the set of vertices for creating a triangular grid may be performed iteratively until the differences are below the predetermined error threshold. Curved triangles may be created and discarded during the iterative process, as the triangular grid is revised.

In various examples, the set of grid lines for one iteration of the triangular grid may not be preserved in the next iteration. The triangular grid may be created based on the set of vertices. Some shapes of triangles, such as long, skinny triangles, may be less desirable shapes. Grid lines present in a prior iteration may cause long, skinny triangles and thus not be present in a later iteration. For example, a vertex may be added close to the midpoint of the hypotenuse of a right, isosceles triangle. If the grid lines were maintained between iterations, the right, isosceles triangle may be divided into three triangles, with a long, skinny triangle formed along the hypotenuse of the right, isosceles triangle. Instead of preserving that hypotenuse as a grid line for the next iteration, the added vertex may be connected by a grid line to the vertex opposite the hypotenuse on the neighboring triangle. Thus, a triangle in a triangular grid from an earlier iteration may partially overlap a triangle in a triangular grid from a later iteration, with both triangles encompassing an area not encompassed by the other.

In various examples, the resulting curved triangles may be of various sizes, as some sections of the received 3D object representation may be broken up into more and smaller curved triangles than another section. For example, this may occur where a surface of the 3D object representation varies significantly in a small surface area, and the use of more curved triangles may better capture the detail.

Figure 2:
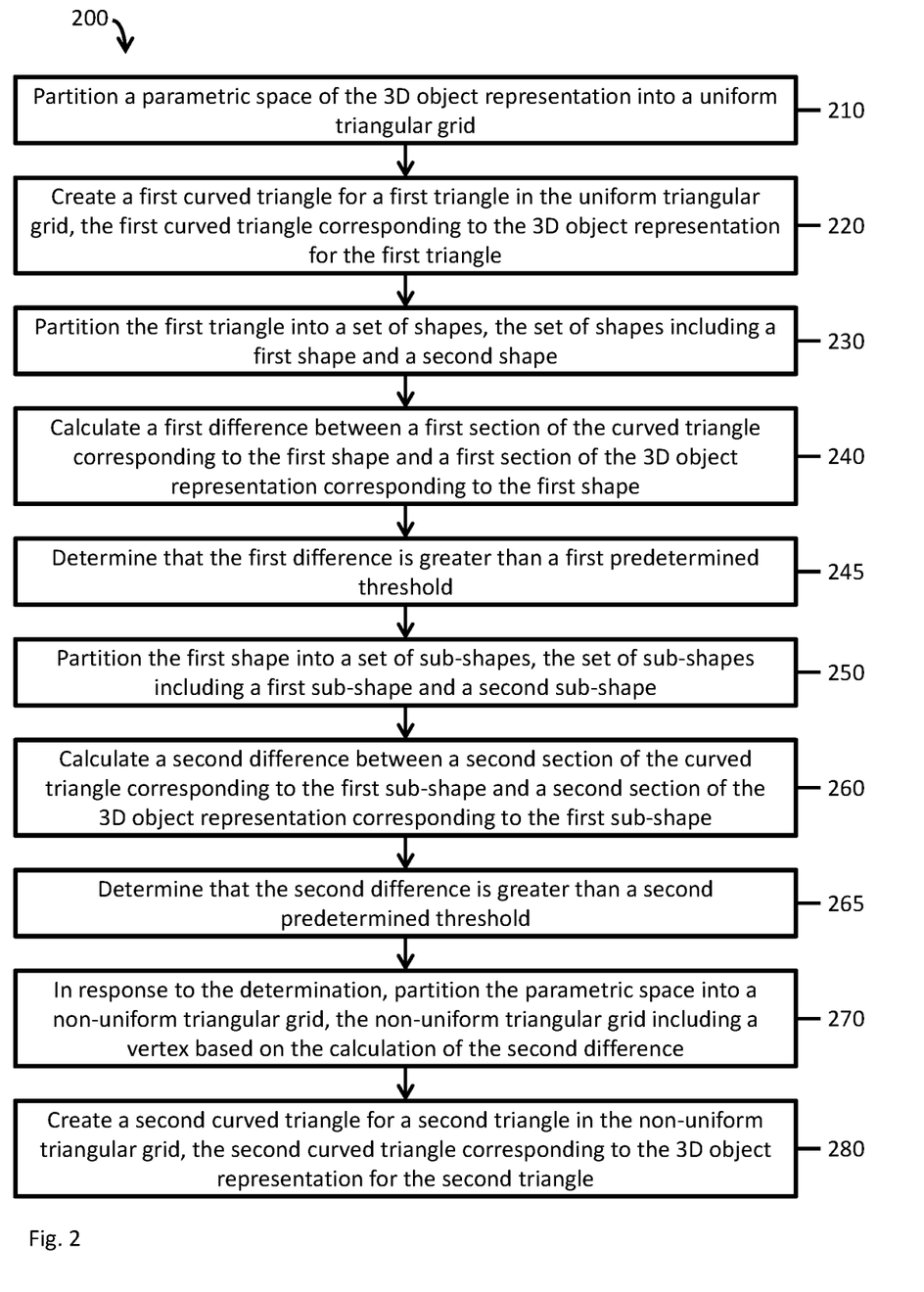
FIG. 2 shows a method of partitioning a 3D object representation and creating corresponding curved triangles in accordance with various examples.

FIG. 2 shows a method 200 of partitioning a 3D object representation and creating corresponding curved triangles in accordance with various examples. Method 200 includes partitioning a parametric space of the 3D object representation into a uniform triangular grid (210). Method 200 includes creating a first curved triangle for a first triangle in the uniform triangular grid, the first curved triangle corresponding to the 3D object representation for the first triangle (220). Method 200 includes partitioning the first triangle into a set of shapes, the set of shapes including a first shape and a second shape (230). Method 200 includes calculating a first difference between a first section of the curved triangle corresponding to the first shape and a first section of the 3D object representation corresponding to the first shape (240). Method 200 includes determining that the first difference is greater than a first predetermined threshold (245). Method 200 includes partitioning the first shape into a set of sub-shapes, the set of sub-shapes including a first sub-shape and a second sub-shape (250). Method 200 includes calculating a second difference between a second section of the curved triangle corresponding to the first sub-shape and a second section of the 3D object representation corresponding to the first sub-shape (260). Method 200 includes determining that the second difference is greater than a second predetermined threshold (265). Method 200 includes, in response to the determination, partitioning the parametric space into a non-uniform triangular grid, the non-uniform triangular grid including a vertex based on the calculation of the second difference (270). Method 200 includes creating a second curved triangle for a second triangle in the non-uniform triangular grid, the second curved triangle corresponding to the 3D object representation for the second triangle (280).

In various examples, a difference between a curved triangle and the corresponding section of the received 3D object representation may be calculated by partitioning the triangle corresponding to the curved triangle into a set of shapes. The difference between the shapes in the set and the corresponding sections of the received 3D object representation may be calculated, such as by calculating the distance between the corresponding barycenters. The shapes with significant distances may be partitioned into sub-shapes. The distance between the corresponding barycenters of the sub-shapes may be calculated. Rather than initially breaking a triangle up into large numbers of smaller shapes and calculating the differences between the smaller shapes and corresponding sections of the received 3D object representation, a search process may be used to identify sections with significant differences. The curved triangle may be subdivided into a few large shapes. The shapes that show significant differences may be partitioned into sub-shapes for additional analysis. This may be iterated to break the shapes into smaller and smaller sub-shapes to identify a portion of a curved triangle with a large difference from the received 3D object representation and to approximate the largest distance between corresponding surface points. For example, a large flat area may be closely modeled by a curved triangle. Calculating differences for multiple points across such an area may result in no points with significant differences between the curved triangle and the received 3D object representation. Instead of calculating differences across large surface areas with little detail, the search process may more quickly identify sections with significant detail and additional points to add to the set of vertices when partitioning the parametric space of the received 3D object representation.

Figure 3:
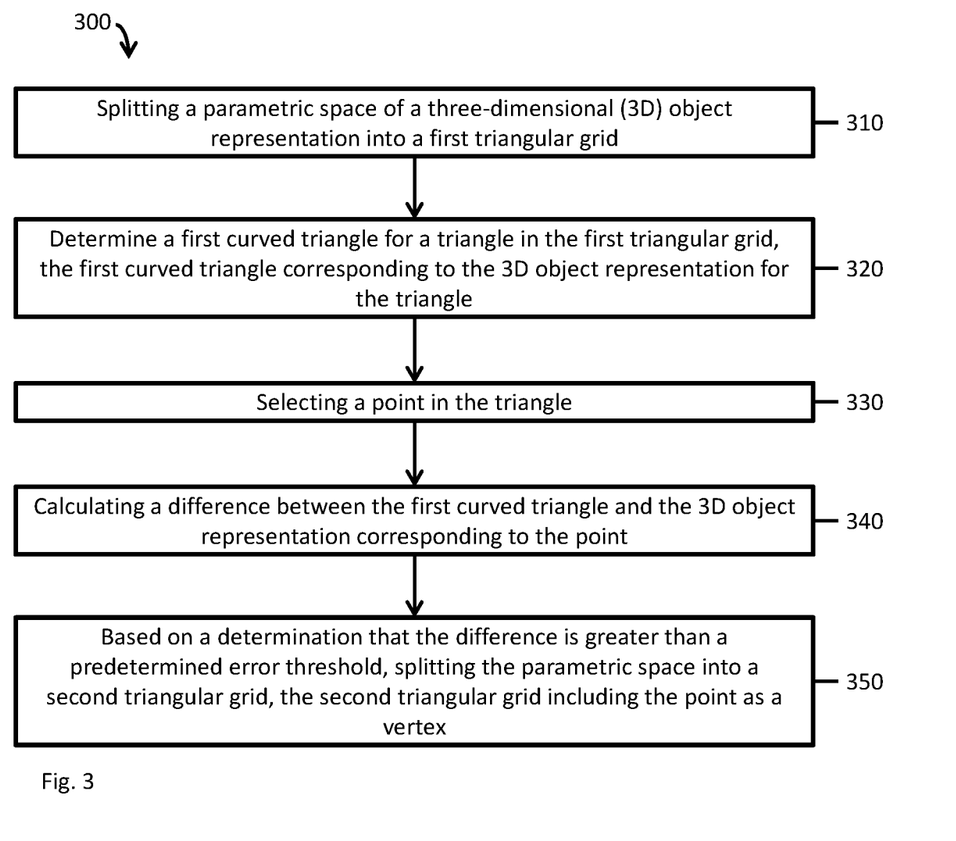
FIG. 3 shows a method of splitting a triangle for comparing a 3D object representation with a curved triangle at a corresponding point in accordance with various examples.

FIG. 3 shows a method 300 of splitting a triangle for comparing a 3D object representation with a curved triangle at a corresponding point in accordance with various examples. Method 300 includes splitting a parametric space of a three-dimensional (3D) object representation into a first triangular grid (310). Method 300 includes determining a first curved triangle for a triangle in the first triangular grid, the first curved triangle corresponding to the 3D object representation for the triangle (320). Method 300 includes selecting a point in the triangle (330). Method 300 includes calculating a difference between a point on the curved triangle and a point on the 3D object representation corresponding to the point in the triangle (340). Method 300 includes, based on a determination that the difference is greater than a predetermined error threshold, splitting the parametric space into a second triangular grid, the second triangular grid including the point as a vertex (350).

In various examples, splitting a shape includes creating shapes that share a common side, but whose area does not overlap. In some, a shape may be split in a way that sub-shapes share overlapping areas. This may, for example, make calculations on the shapes easier.

Figure 4:
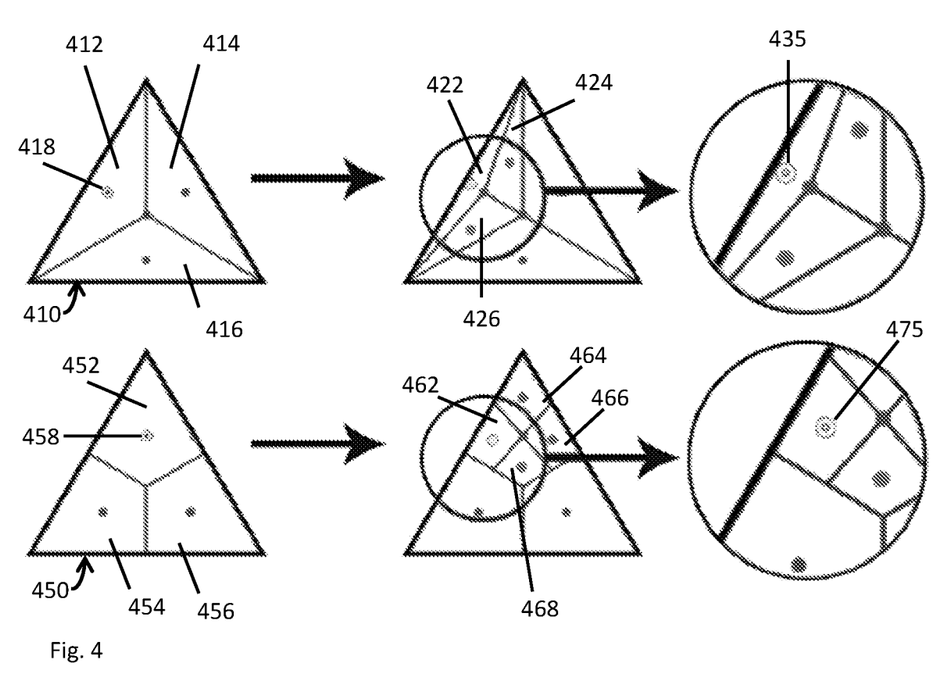
FIG. 4 shows subdivisions of triangles in parametric space for calculating the differences between sections of 3D object representations.

FIG. 4 shows subdivisions of triangles 410, 450 in parametric space for calculating the differences between sections of 3D object representations. Triangles 410, 450 may correspond to a curved triangle in parametric space.

In various examples, triangle 410 may be divided into three obtuse isosceles triangles 412, 414, 416, such as by connecting the corners of triangle 410 to the center of triangle 410. Other shapes of triangles may be used, and the triangles may not be equivalent shapes. The distance between the curved triangle's evaluations of the barycenters of the obtuse isosceles triangles 412, 414, 416 and the corresponding location on the received 3D object representation may be calculated. The curved triangle's barycenter 418 of obtuse isosceles triangle 412 may have a corresponding distance larger than the error threshold. The obtuse isosceles triangle 412 may be subdivided into three sub-triangles 422, 424, 426 by connecting corners of the obtuse isosceles triangle 412 with its center. The corresponding distance from the received 3D object representation for the barycenters of the sub-triangles 422, 424, 426 may be calculated. The corresponding distance for barycenter 435 of sub-triangle 422 may be larger than the error threshold. This may indicate an area where the curved triangle varies significantly from the received 3D object representation. Barycenters 418, 435 may be added to the set of vertices used in a subsequent subdividing of the parametric space of the 3D object representation into a triangular grid.

In this way, for example, an area of high difference from the received 3D object representation may be identified by a two-step subdivision process, dividing a triangle in parametric space into three triangles, then one of those triangles into three sub-triangles, calculating the difference at six locations. This may produce comparable results in a shorter time to dividing the original triangle into a grid of 64 sub-triangles and calculating the difference at 21 internal grid points.

In various examples, subdividing the triangle 410 or sub-triangles 412, 414, 416 may be performed in different ways. For example, the obtuse isosceles triangle 412 may be divided into two sub-triangles by dividing the obtuse isosceles triangle 412 in half. The subdivision and subsequent subdivision may be into shapes other than triangles.

In various examples, triangle 450 may correspond to the curved triangle of triangle 410. Triangle 450 may be divided into three equivalent quadrilaterals 452, 454, 456, such as by connecting the center of the triangle 450 to midpoints of the sides. Non-equivalent triangles and other shapes may also be used. The distance between the curved triangle and the received 3D object representation may be calculated at barycenters of the quadrilaterals 452, 454, 456, such as a barycenter 458 of quadrilateral 452. Quadrilateral 452 may have a distance corresponding to its barycenter 458 that exceeds the error threshold and may be selected for subdivision. Quadrilateral 452 may be subdivided into four sub-quadrilaterals 462, 464, 466, 468 by connecting midpoints of the non-adjacent sides. The distance of the curved triangle's evaluations of the barycenters of the sub-quadrilaterals 462, 464, 466, 468 from the corresponding locations on the received 3D object representation may be calculated. Barycenter 475 of sub-quadrilateral 462 may have a corresponding distance that exceeds the error threshold. Barycenters 458, 475 may be added to the set of vertices used in a subsequent subdividing of the parametric space of the 3D object representation into a triangular grid.

Other shapes and numbers of subdivisions may also be used. The subsequent subdivisions may be of different shapes. For example, a first subdivision into quadrilaterals may have a second subdivision into triangles. Additional subdivisions may be performed, such as a third or fourth subdivision. Subsequent subdivision may proceed as part of an iterative process until no more shapes are produced with corresponding distances exceeding the error threshold or until a maximum iteration count is reached.

For example, triangle 450 may be divided into three quadrilaterals 452, 454, 456 of equivalent shape. The sides of the quadrilaterals 452, 454, 456 may correspond to the sides of the triangle 450, with additional edges formed between the midpoints of the sides and the center of the triangle 450. The subdivisions may be triangles 412, 414, 416, such as by forming three obtuse isosceles triangles 412, 414, 416 by connecting the midpoints of the sides to the center of the triangle 410.

Figure 5A:
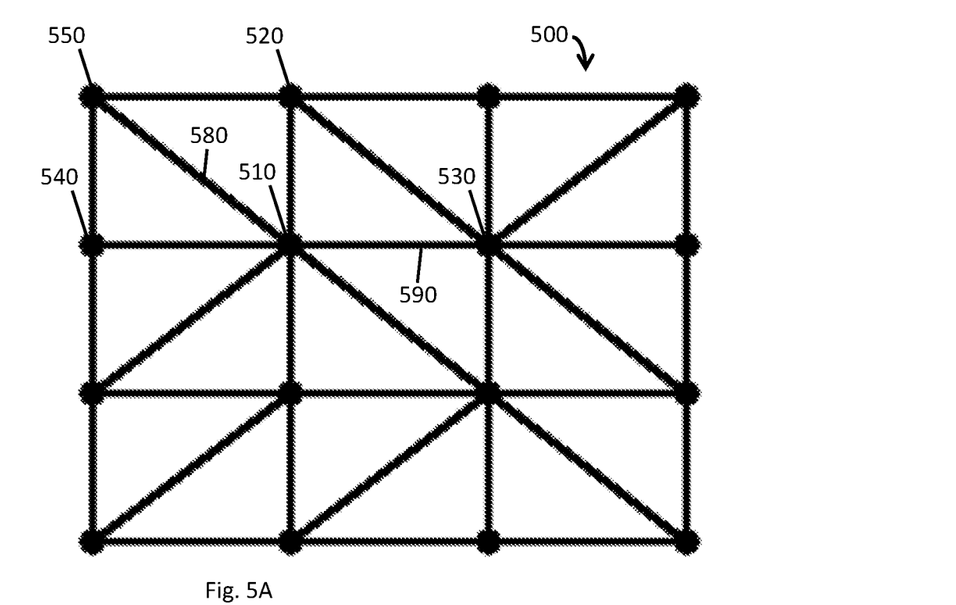
FIG. 5A shows a triangularization of a parametric space using a uniform grid.

FIG. 5A shows a triangularization of a parametric space using a uniform grid 500. The uniform grid 500 includes vertices 510, 520, 530, 540, 550 and grid lines 580, 590. The grid 500 is uniform as the triangles comprising the grid 500 are equal size in parametric space. For example, the triangle formed by vertices 510, 520, 550 is the same size as the triangle formed by vertices 510, 520, 530. The triangularization may be performed by taking the set of vertices 510, 520, 530, 540, 550 and placing grid lines 580, 590 between the vertices 510, 520, 530, 540, 550 to subdivide the uniform grid 500 into triangles. The triangles may be compared between the different 3D object representations, as disclosed elsewhere herein.

Figure 5B:
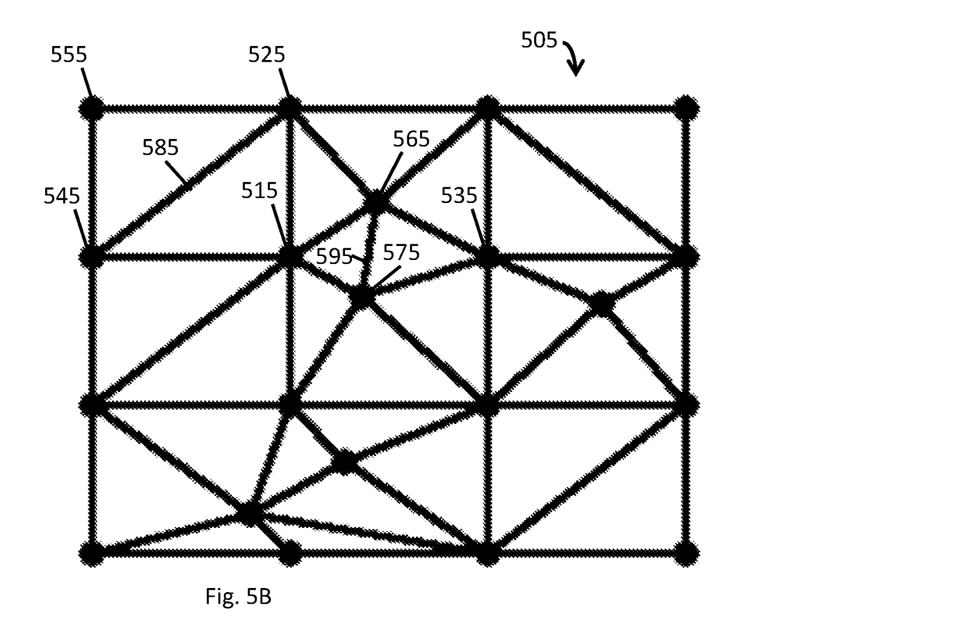
FIG. 5B shows a triangularization using a non-uniform grid.

FIG. 5B shows a triangularization using a non-uniform grid 505. The non-uniform grid 505 includes vertices 515, 525, 535, 545, 555, 565, 575 and grid lines 585, 595. Grid 505 is non-uniform as there are triangles of different sizes in parametric space. For example, the triangle formed by the vertices 525, 545, 555 is larger and a different shape than the triangle formed by the vertices 515, 565, 575. Non-uniform grid 505 may be created after comparing the different 3D object representations and adding vertices 565, 575 where the distance between the 3D object representations is greater than an error threshold. Non-uniform grid 505 may be created by triangularization between the vertices 515, 525, 535, 545, 555, 565, 575 via the placement of grid lines 585, 595.

In various examples, the uniform grid 500 may correspond to a first iteration of comparing two 3D object representations and the non-uniform grid 505 may correspond to a second iteration of comparing the two 3D object representations. Vertices 565, 575 may be added to the set of vertices for the second iteration based on the comparison of the 3D object representations in the first iteration. The triangles forming the non-uniform grid 505 may be different than the triangles forming the uniform grid 500. For example, the rectangle formed by vertices 510, 520, 540, 550 in the uniform grid 500 may correspond to the rectangle formed by vertices 515, 525, 545, 555 in the non-uniform grid. In placing the grid lines, grid line 580 may be used to split the rectangle in half in the uniform grid 500, while grid line 585 may be used to split the corresponding rectangle in half in the non-uniform grid.

In various examples, a grid line 590 in the uniform grid 500 may not have a corresponding grid line in the non-uniform grid 505. For example, a grid line between vertices 515, 535 may create a long, skinny triangle between vertices 515, 535, 575, which may be undesirable. Instead, a grid line 595 may be placed, resulting in a triangle between vertices 515, 565, 575 and a triangle between vertices 535, 565, 575. The triangle formed by vertices 510, 520, 530 may have an area that would overlap the triangle formed by vertices 515, 565, 575 if the triangles were in the same grid 500, 505. The two triangles may also have separate areas that would not overlap. In various examples, a triangle in the non-uniform grid 505 may be entirely within the corresponding area of a triangle in the uniform grid 500.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium to store machine-readable instructions that, when executed by a processor, cause the processor to:
   receive a three-dimensional (3D) object representation;
   subdivide a parametric space of the 3D object representation into a first triangular grid, the first triangular grid comprising a first set of grid lines and a first set of vertices where grid lines in the first set of grid lines intersect;
   calculate a first curved triangle for a first triangle in the first triangular grid, the first curved triangle corresponding to the 3D object representation for the first triangle;
   subdivide the first triangle into at least a first subdivision and a second subdivision;
   calculate a first difference between a first point on the 3D object representation and a corresponding first point on the first curved triangle, the first point on the 3D object representation corresponding to a point within the first subdivision;
   in response to the first difference exceeding a predetermined error threshold,
   subdivide the first subdivision into at least a third subdivision and a fourth subdivision;
   calculate a second difference between a second point of the 3D object representation and a corresponding second point on the first curved triangle, the second point on the 3D object representation corresponding to a point within the third subdivision; and
   in response to the second difference exceeding the predetermined error threshold, combine the point within the first subdivision and the point within the third subdivision with the first set of vertices to create a second set of vertices.

2. The computer-readable medium of claim 1, wherein the 3D object representation comprises a non-uniform rational basis spline (NURBS) format.

3. The computer-readable medium of claim 1, wherein the first triangular grid includes a uniform triangular grid.

4. The computer-readable medium of claim 1, wherein the first subdivision and the second subdivision are equivalent shapes.

5. The computer-readable medium of claim 1, wherein execution of the machine-readable instructions by the processor causes the processor to further:
   calculate a first intersection between the second curved triangle and a plane in Euclidean space.

6. The computer-readable medium of claim 1, wherein execution of the machine-readable instructions by the processor causes the processor to further:

subdivide the parametric space into a second triangular grid, the second triangular grid comprising a second set of grid lines between the second set of vertices;

calculate a second curved triangle for a second triangle in the second triangular grid; and print a 3D object based on the second curved triangle.

7. A non-transitory computer-readable medium to store machine-readable instructions that, when executed by a processor, cause the processor to:

partition a parametric space of a 3D object representation into a uniform triangular grid comprising a first set of vertices;

create a first curved triangle for a first triangle in the uniform triangular grid, the first curved triangle corresponding to the 3D object representation for the first triangle;

partition the first triangle into a set of shapes, the set of shapes including a first shape and a second shape;

calculate a first difference between a first point on the 3D object representation and a corresponding first point on the first curved triangle, the first point on the 3D object representation corresponding to a point within the first shape;

determine that the first difference is greater than a first predetermined error threshold;

in response to the determination that the first difference is greater than the first predetermined error threshold, partition the first shape into a set of sub-shapes, the set of sub-shapes including a first sub-shape and a second sub-shape;

calculate a second difference between a second point on the 3D object representation and a corresponding second point on the first curved triangle, the second point on the 3D object representation corresponding to a point within the first sub-shape;

determine that the second difference is greater than a second predetermined error threshold;

in response to the determination that the second difference is greater than the second predetermined error threshold, combining the point within the first shape and the point within the second sub-shape with the first set of vertices to create a second set of vertices.

8. The computer-readable medium of claim 7, wherein the set of shapes includes a third shape, and wherein the first, second, and third shapes are quadrilaterals.

9. The computer-readable medium of claim 8, wherein the set of sub-shapes includes a third sub-shape and a fourth sub-shape, and wherein the first, second, third, and fourth sub-shapes are quadrilaterals.

10. The computer-readable medium of claim 7, wherein the calculation of a first difference includes calculation of a chordal error of the barycenter of the first shape.

11. The computer-readable medium of claim 7, wherein the first predetermined error threshold is the same as the second predetermined error threshold.

12. The computer-readable medium of claim 7, wherein execution of the machine-readable instructions by the processor causes the processor to further:

partitioning the parameter space into a non-uniform triangular grid comprising the second set of vertices;

calculate a second curved triangle for a second triangle in the non-uniform triangular grid; and printing a 3D object based on the second curved triangle.

13. A method comprising:

splitting a parametric space of a three-dimensional (3D) object representation into a first triangular grid having a first set of vertices;

determining a first curved triangle for a first triangle in the first triangular grid, the first curved triangle corresponding to the 3D object representation for the triangle;

subdividing the first triangle into at least a first subdivision and a second subdivision;

calculating a first difference between a first point on the 3D object representation and a corresponding first point on the first curved triangle, the first point on the 3D object representation corresponding to a point within the first subdivision;

in response to the first difference exceeding a predetermined error threshold, subdividing the first subdivision into at least a third subdivision and a fourth subdivision;

calculating a second difference between a second point of the 3D object representation and a corresponding second point on the first curved triangle, the second point on the 3D object representation corresponding to a point within the third subdivision; and in response to the second difference exceeding the predetermined error threshold, combining the point within the first subdivision and the point within the third subdivision with the first set of vertices to create a second set of vertices.

14. The method of claim 13, wherein the first, second, third, and fourth subdivisions are each a triangle.

15. The method of claim 14, wherein the first subdivision and the second subdivision are equivalent shapes.

16. The method of claim 13, wherein the first triangular grid is uniform.

17. The method of claim 13, further comprising:

splitting the parametric space into a second triangular grid comprising the second set of vertices;

calculating a second curved triangle for a second triangle in the second triangular grid; and printing a 3D object based on the second curved triangle.

* * * * *